US011093309B1

(12) United States Patent
Katzer

(10) Patent No.: US 11,093,309 B1
(45) Date of Patent: Aug. 17, 2021

(54) COMMUNICATION HUB FOR INFORMATION TECHNOLOGY (IT) SERVICES

(71) Applicant: T-MOBILE INNOVATIONS LLC, Overland Park, KS (US)

(72) Inventor: Robin Dale Katzer, Louisburg, KS (US)

(73) Assignee: Sprint Communications Company L.P., Overland Park, KS (US)

(*) Notice: Subject to any disclaimer, the term of this patent is extended or adjusted under 35 U.S.C. 154(b) by 0 days.

(21) Appl. No.: 16/941,408

(22) Filed: Jul. 28, 2020

(51) Int. Cl.
*G06F 16/20* (2019.01)
*G06F 9/54* (2006.01)
*G06N 5/02* (2006.01)
*G06F 16/2455* (2019.01)
*H04L 29/06* (2006.01)
*G10L 15/18* (2013.01)
*H04L 12/58* (2006.01)
*G10L 15/22* (2006.01)
*G06Q 30/00* (2012.01)

(52) U.S. Cl.
CPC ........ *G06F 9/546* (2013.01); *G06F 16/24565* (2019.01); *G06N 5/027* (2013.01); *G10L 15/1822* (2013.01); *G10L 15/22* (2013.01); *H04L 51/18* (2013.01); *H04L 63/08* (2013.01); *G06Q 30/016* (2013.01); *G10L 2015/223* (2013.01)

(58) Field of Classification Search
CPC ... G06F 9/546; G06F 16/24565; G06N 5/027; G10L 15/1822; G10L 15/22; G10L 2015/223; H04L 51/18; H04L 63/08; G06Q 30/016
See application file for complete search history.

(56) References Cited

U.S. PATENT DOCUMENTS

| | | | | |
|---|---|---|---|---|
| 8,626,716 B1* | 1/2014 | Katzer | ............ | G06F 16/27 707/646 |
| 2005/0015619 A1* | 1/2005 | Lee | ............ | G06Q 10/10 726/4 |
| 2010/0125574 A1* | 5/2010 | Navas | ............ | G06F 16/2255 707/722 |
| 2018/0203744 A1* | 7/2018 | Wiesmaier | ............ | G06F 9/4881 |
| 2018/0259922 A1* | 9/2018 | Nill | ............ | H02J 13/00004 |
| 2019/0370370 A1* | 12/2019 | Wittern | ............ | G06F 9/54 |
| 2020/0034399 A1* | 1/2020 | Beno | ............ | G06F 16/3329 |

* cited by examiner

*Primary Examiner* — Doon Y Chow
*Assistant Examiner* — Abdou K Seye

(57) ABSTRACT

A method of multilayer communication between a front-end application and at least one back-end includes receiving a message by a communication message broker that executes on a computer system from the front-end application, sending information of the message to an event bridge that executes on a computer system, parsing the information by the event bridge to determine at least one request, prompting a rules database by the event bridge to look up a rule, identifying the rule that applies to the at least one request by the rules database, processing the at least one request by the event bridge in response to the rule, sending the at least one processed request from the event bridge to a query application that executes on a computer system, and resolving at least one query by the query application to send at least one call to at least one back-end application.

20 Claims, 9 Drawing Sheets

COMMUNICATION HUB FOR INFORMATION TECHNOLOGY (IT) SERVICES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Front-end applications and back-end applications may communicate in a manner which is synchronous and point-to-point. A front-end application connects to a network using an application programming interface (API). The front-end application may be enabled by user equipment such as a mobile application on a mobile phone or a browser on a personal computer. When the API establishes a connection to the network, the front-end application sends out one or more requests to a server. These requests may be relevant for a user browsing the Internet for online purchasing or updating personal information for a mobile account. The server is enabled by a computer process and communicates the one or more requests to at least one back-end application. The back-end applications are also enabled by a computer process and may be used for customer service applications to update a database of customer information or a proprietary application for big box stores to manage customer requests. The same server that enables communication to the back-end application may be used for executing the back-end application or separate servers entirely may be used to enable the back-end application. The server receives information from the back-end applications relevant to the one or more requests from the front-end applications and updates the API to the front-end application accordingly.

SUMMARY

In an embodiment, a method of multilayer communication between a front end application and at least one back end application includes receiving a message by a communication message broker that executes on a computer system from the front end application corresponding to a primary user, wherein the communication message broker comprises at least one interface to communicate with the primary user. The method further comprises organizing information of the message by the communication message broker to send the organized information of the message to an event bridge that executes on a computer system. The method then comprises parsing the organized information by the event bridge to determine at least one request, wherein the at least one request corresponds to an action of the primary user. The method further comprises prompting a rules database by the event bridge to look up a rule in the rules database. The method further comprises identifying the rule that applies to the at least one request by the rules database based on an opt-in parameter corresponding to the primary user, wherein the opt-in parameter comprises a business account number (BAN) and a rule identifier. The method further comprises returning the rule to the event bridge by the rules database. The method further comprises processing the at least one request by the event bridge in response to the rule. The method further comprises sending the at least one processed request from the event bridge to a query application that executes on a computer system. The method further comprises parsing the at least one request to identify at least one query by the query application. The method further comprises resolving the at least one query by the query application to send at least one call to the at least one back end application. The method further comprises receiving at least one response to the at least one query by the query application from the at least one back end application. The method further comprises sending the at least one response by the query application to the event bridge. The method further comprises parsing the at least one response by the event bridge to identify an appropriate response to the at least one response. The method further comprises sending by the event bridge to the primary user and at least one secondary user a response message based on the appropriate response.

In another embodiment, a method of multilayer communication between a front end application and at least one back end application includes receiving a message by a communication message broker that executes on a computer system from the front end application corresponding to a primary user, wherein the communication message broker comprises at least one interface to communicate with the primary user. The method further comprises organizing information of the message by the communication message broker to send the organized information of the message to an event bridge that executes on a computer system. The method further comprises parsing the organized information by the event bridge to determine at least one request, wherein the at least one request corresponds to an action of the primary user. The method further comprises prompting a rules database by the event bridge to look up a rule in the rules database. The method further comprises identifying the rule that applies to the at least one request by the rules database based on an opt-in parameter corresponding to the primary user, wherein the opt-in parameter comprises a BAN and a rule identifier. The method further comprises returning the rule to the event bridge by the rules database. The method further comprises processing the at least one request by the event bridge in response to the rule. The method further comprises sending the at least one processed request from the event bridge to a query application that executes on a computer system. The method further comprises parsing the at least one request to identify at least one query by the query application. The method further comprises resolving the at least one query by the query application to send at least one call to the at least one back end application. The method further comprises receiving at least one response to the at least one call by the query application from the at least one back end application. The method further comprises sending the at least one response to the event bridge by the query application. The method further comprises parsing the at least one response by the event bridge to identify an appropriate response, wherein the appropriate response responds to the message from the primary user. The method further comprises sending by the event bridge to the primary user and at least one secondary user a response message based on the appropriate response, wherein the response message is a notification of an invitation to the primary user and is the invitation to the at least one secondary user. The method further comprises receiving at least one response by the communication message broker from the at least one secondary user that indicates acceptance of the invitation and completion of an action by the at least one secondary user. The method further comprises sending a notification of completed action to the primary user from the communication message broker in response to receiving the at least one response from the at least one secondary user. The method further comprises receiving a notification of completed transaction by the communication message broker from the primary user.

In yet another embodiment, a method of multilayer communication between a front end application and at least one back end application includes receiving a message by a communication message broker that executes on a computer system from the front end application corresponding to a primary user, wherein the communications broker comprises at least one interface to communicate with the primary user. The method further comprises, sending information of the primary user by the communication message broker to a two-factor authentication system to verify the information of the primary user. The method further comprises, receiving an authentication notification by the communication message broker from the two-factor authentication system. The method further comprises, organizing information of the message by the message broker to send the organized information to an event bridge that executes on a computer system when the authentication notification indicates verification of the primary user. The method further comprises, parsing the information by the event bridge to determine at least one request, wherein the at least one request corresponds to an action of the primary user. The method further comprises, prompting a rules database by the event bridge to look up a rule in the rules database. The method further comprises, identifying the rule that applies to the at least one request by the rules database based on an opt-in parameter corresponding to the primary user, wherein the opt-in parameter comprises a BAN and a rule identifier. The method further comprises, returning the rule by the rules database to the event bridge. The method further comprises, processing the at least one request by the event bridge in response to the rule. The method further comprises, sending the at least one processed request by the event bridge to a query application that executes on a computer system. The method further comprises, parsing the at least one request by the query application to identify at least one query. The method further comprises, resolving the at least one query by the query application to send at least one call to the at least one back end application. The method further comprises, receiving at least one response to the at least one query by the query application from the at least one back end application. The method further comprises, sending the at least one response by the query application to the event bridge. The method further comprises, parsing the at least one response by the event bridge to identify an appropriate response to the at least one response. The method further comprises, sending by the event bridge to the primary user and at least one secondary user a response message based on the appropriate response.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
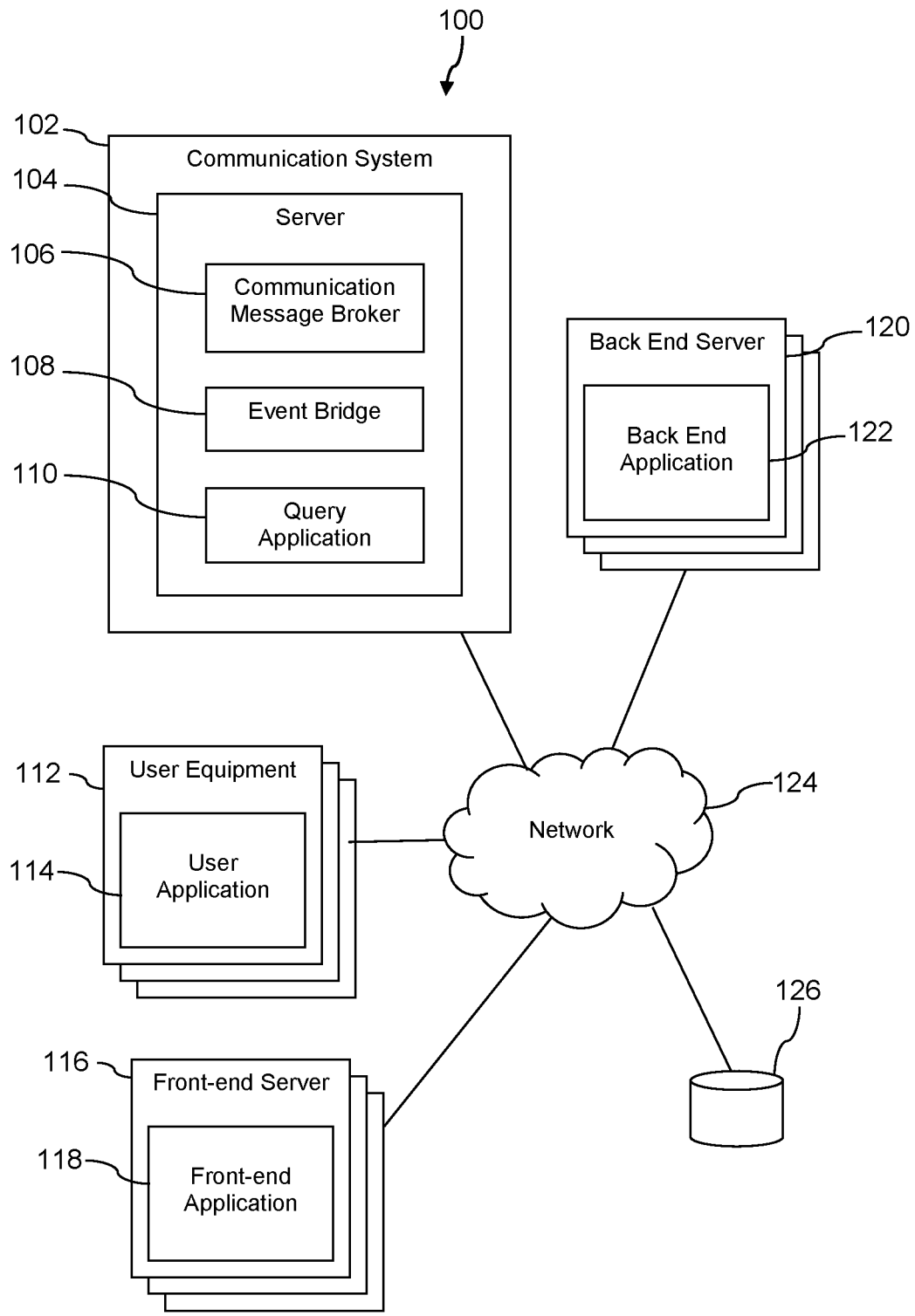
FIG. 1 is a block diagram of a communication hub according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The communication hub is a tool that operates in an IT infrastructure and establishes a connection between a front-end application and a back-end. The communication hub does not support network traffic such as voice and data calls. The communication hub takes over some of the communication responsibilities currently distributed to back-end applications and/or microservices. A user may prompt the front-end to initiate a command requiring the back-end to pull information regarding that user. In between the front-end and the back-end, the communication hub reacts to the command based on business rules programmed into a rules engine that is part of the communication hub. Although in current systems the back-end often has to be reprogrammed to accommodate updates to front-end APIs, the communication hub avoids this bottleneck because of the adaptability and customizability of the rules engine. Moreover, current approaches offer inflexible back-ends that cannot adapt to the various requirements by different devices with which a user may access the network. The communication hub avoids this pitfall and allows flexible handling of different requirements through multiple interface ports that can handle various device requirements such as screen resolution. For example, if the users accessing the front-end applications were using separate devices (e.g., a phone, a tablet, and a personal computer, respectively), then the communication hub would be able to handle the various device requirements to be sent to the devices through the interface ports.

Front-end systems include proprietary mobile applications, other mobile applications, big box store applications, Interactive Voice Response (IVR) systems, customer service applications, and/or the like. Back-end systems include customer account details, billing systems, and/or the like.

The communication hub comprises a communication message broker facing the front-end applications, an event bridge that comprises a rules engine and a rules database, and a query application. The communication message broker is able to queue messages to be sent to front-end applications which have yet to establish a connection to receive the associated message. When the front-end application connects to a network, it receives the queued message. The queuing of messages includes the ability to specify a shelf-life of messages and if a message is not received timely the message expires and is removed. For example, the communication message broker may be implemented with Message Queue Telemetry Transport (MQTT), which is an AMAZON WEB SERVICES (AWS) Internet of things (loT) Message Broker. When front-end applications send a request they identify themselves by a business account number (BAN) or other identity. Queries from front-end applications can stipulate what kind of response they want to receive. For example, they may stipulate what specific data they will receive. The queries are asynchronous Hypertext Transfer Protocol (HTTP) calls, making them a persistent, two-way communication connection. A front-end can define a topic and at the same time associate a BAN with the topic. The rule engine of the event bridge then processes events/queries related to that topic based on the rules associated with the BAN. In an embodiment, when a front-end application logs in, it may undergo two-factor authentication and receive an authorization token. When the front-end application sends a request to the communication hub it may send the authorization token, and the communication hub may validate the authorization token before handling the request.

The event bridge may be implemented as an AWS Event Bridge. The event bridge registers interest in topics, receives requests, looks up rules from a rules database to learn how to process the requests, and then processes the requests accordingly. The event bridge evaluates events and requests from the communication message broker using rules based on the BAN or other identity associated with the event/request. The rules are configured in advance of operation. A rule can indicate that a response to a query from one device associated with a BAN be returned to each of the devices associated with the same BAN. For example, one query from a head of household can result in responses sent to each of the mobile communication devices of all household members—father, mother, and children.

The query application may be implemented with GraphQL. The query application provides a plurality of resolvers which are defined and coded by developers. A resolver can receive a single query from the event bridge (indirectly from a front-end application) and map that single query into multiple requests or API calls to different back-end applications. The resolvers establish communication with at least one back-end server to resolve the corresponding query. The resolvers then pull back information from the at least one back-end server which resolves the corresponding query. The resolver consolidates the received information into a single package. The resolver then further reduces the information in the package to what the front-end application is requesting, which may be a subset of the data received from the back-end applications.

As a first use case, a response to a front-end application from a back-end application may be returned to other front-end applications based on rules in the communication hub. An account may comprise various users such as a primary user and at least one secondary user. The primary user may initiate an account change of personal information regarding all of the users. In response to the account change, the communication hub facilitates communication between the front-end servers and the back-end servers. The communication hub then sends notifications to both the primary user and the secondary users indicating a change to the account based on the rules in the rules database. For example, if a primary user wishes to combine accounts with a sibling, then the rules in the communication hub prompts the communication hub to send notifications to the primary user and the sibling when the accounts have been combined.

As a second use case, a father of a family may want to upgrade his phone and also upgrade three of his children's phones, where the father and the children are all under a single account. The father may go into a web app, initiate a shopping cart, add his chosen phone to the shopping cart, and then indicate that the children are to be invited to share the shopping cart. The communication hub accordingly communicates the invitation to the children and promotes the children selecting their upgrade phones. When the children selections are complete, the communication hub can notify the father. The father can verify the children's selections and then submit the order. This functionality is largely provided by the communication hub.

As a third use case, an IVR may desire to conduct a two-factor authentication on a user that is ordering a product. Rather than embedding this two-factor authentication in the IVR, a rule in the communication hub can cause the communication hub to access a security platform, complete the two-factor authentication via the security platform, and only after two-factor authentication has completed successfully then the communication hub can pass the communication to the IVR.

In FIG. 1, a system 100 is described. In an embodiment, the system 100 comprises a communication system (i.e., the communication hub) 102 comprising a server 104, wherein the server 104 comprises a communication message broker 106, an event bridge 108, and a query application 110. The communication system 102 establishes a communication link to a network 124. The communication system 102 communicates via the network 124 to the front-end server 116, the rules database 126, and the back-end server 120. The front-end server 116 is one or more servers each comprising a front-end application 118. The back-end server 120 is one or more servers each comprising a back-end application 122. The front-end server 116 communicates via the network 124 to the user equipment 112. The communication hub 102 may also support requests from the front-end server 116 independent of actions from the user equipment 112. The user equipment 112 is one or more wireless communication devices each comprising a user application 114, e.g., a mobile phone, wearable computer, laptop computer, and/or the like. Communication between the front-end server 116, the communication system 102, and the back-end server 120 allows the communication system 102 asynchronously to perform IT service for the user equipment 112.

This IT service delivered to the user equipment 112 by the communication system 102 allows for common but tailored responses for various customers within a group. The rules database 126 allows for agnostic communication between the front-end and the back-end based on the customizable rules which define what type of action is required for which requests from the user, therefore, allowing ease of communication. Agnostic communication in this application refers to communication that is generalized such that it is interoperable among various systems. This previously has been difficult to accomplish because of the dependence on updating the back-end each time the front-end changes an API. Additionally, the rules in the rules database 126 determines whether this request from the user is to respond to multiple users within a group under the same family unit or business unit, e.g., family plan or BAN, irrespective of the type of the user equipment 112 being used by the multiple users. This allows for the IT service to deliver common but tailored responses for each customer within the respective group.

In an embodiment, the user equipment 112 communicates with the front-end server 116 via the network 124 such that the front-end applications send messages relating to an action by a user. For example, the user may be checking account information or browsing to purchase a new item to add to an account. The front-end server 116 communicates with the communication system 102 via the network 124 to send the messages. The communication system 102 receives the messages from the front-end server 116 where the messages are forwarded to the communication message broker 106, where the communication message broker 106 organizes information of the message. The communication message broker 106 then forwards the organized information to the event bridge 108 where the event bridge 108 breaks down the information further into requests where the event bridge 108 requires verification from a rules database 126 on how to proceed. From here, the event bridge 108 consults the rules database 126 to identify the appropriate approach to satisfy the requests. The rules in the rules database 126 may communicate with the event bridge 108 through a rule plugin, where the rules are customizable based on defined characteristics such as user preferences or account preferences and indicate conditional responses to the defined characteristics. For example, a rule may be to notify the account manager that someone added an item into the account, or if part of the rule may be to send back a message over the event bridge 108 and the user is disconnected from the network 124, then the rule may be to send a Short Message Service (SMS) notification to the user until the message is received. The rules database 126 identifies appropriate rules corresponding with the requests and sends the rules back to the event bridge 108. For example, a rule may be to notify the user of access or a change to an account. The event bridge 108 processes the requests according to the rule from the rules database 126. The requests are sent from the event bridge 108 to the query application 110. The query application 110 further dissects the requests to identify at least one query per request that can be handled by resolvers within the query application 110. There is one resolver per query. The resolvers establish communication with at least one back-end server 120 to resolve the corresponding query. The resolvers then pull back information from the at least one back-end server 120 which resolves the corresponding query. The query application 110 organizes and sends the information which resolves the requests back to the event bridge 108. The event bridge 108 identifies the response from the query application 110 which satisfies the request from the user. The event bridge 108 then sends the response back to the communication message broker 106. The communication message broker 106 then returns the response to the appropriate front-end server 116 corresponding to the user.

Alternatively in an embodiment, the user equipment 112 communicates with the front-end server 116 via the network 124 such that the front-end applications send messages relating to an action by a user. The front-end server 116 communicates with the communication system 102 via the network 124 to send the messages. The communication system 102 receives the messages from the front-end server 116 where the messages are forwarded to the communication message broker 106, where the communication message broker 106 organizes information of the message. The communication message broker 106 then forwards the organized information to the event bridge 108 where the event bridge 108 breaks down the information further into requests where the event bridge 108 requires verification from a rules database 126 on how to proceed. From here, the event bridge 108 consults the rules database 126 to identify the appropriate rules to satisfy the requests. The rules in the rules database 126 may communicate with the event bridge 108 through a rule plugin, where the rules are customizable based on defined characteristics such as user preferences or account preferences and indicate conditional responses to the defined characteristics. For example, a rule may be to notify the account manager that someone added an item into the account, or if part of the rule may be to send back a message over the event bridge 108 and the user is disconnected from the network 124, then the rule may be to send a Short Message Service (SMS) notification to the user until the message is received. The rules database 126 identifies appropriate rules corresponding with the requests and sends the rules back to the event bridge 108. The event bridge 108 processes the requests according to the rule from the rules database 126. The requests are sent from the event bridge 108 to the query application 110. The query application 110 further dissects the requests to identify at least one query per request that can be handled by resolvers within the query application 110. There is one resolver per query. The resolvers establish communication with at least one back-end server 120 to resolve the corresponding query. The resolvers then pull back information from the at least one back-end server 120 which resolves the corresponding query. The query application 110 organizes and sends the information which resolves the requests back to the event bridge 108. The event bridge 108 identifies the response from the query application 110 which satisfies the request from the user. The event bridge 108 then sends the response back to the communication message broker 106. The communication message broker 106 then returns the response to at least one appropriate front-end server 116 corresponding to at least one user. However, if the primary user is not connected to a network and the response message is not delivered, then a rule from the rules database 126 will cause the communication message broker 106 to queue the response for a period of time depending on the rule. For example, the rule may indicate for the communication message broker 106 to queue the response until the next time the user connects to the network, or to queue and resend the response every 24 hours, or to queue and resend the response continuously until the user receives the message.

In another embodiment, the user equipment 112 communicates with the front-end server 116 via the network 124 such that the front-end applications send messages relating to an action by a user. The front-end server 116 communicates with the communication system 102 via the network 124 to send the messages. The communication system 102 receives the messages from the front-end server 116 where the messages are forwarded to the communication message broker 106, where the communication message broker 106 organizes information of the message. The communication message broker 106 then forwards the organized information to the event bridge 108 where the event bridge 108 breaks down the information further into requests where the event bridge 108 requires verification from a rules database 126 on how to proceed. From here, the event bridge 108 consults the rules database 126 to identify the appropriate rules to satisfy the requests. The rules in the rules database 126 may communicate with the event bridge 108 through a rule plugin, where the rules are customizable based on defined characteristics such as user preferences or account preferences and indicate conditional responses to the defined characteristics. For example, a rule may be to notify the account manager that someone added an item into the account, or if part of the rule may be to send back a message over the event bridge 108 and the user is disconnected from the network 124, then the rule may be to send a Short Message Service (SMS) notification to the user until the message is received. The rules database 126 identifies appropriate rules corresponding with the requests and sends the rules back to the event bridge 108. Here the rule directs the communication system 102 to send responses back to the user who is initiating the communication and to any other user on the corresponding BAN. As a result, the event bridge 108 processes the requests according to the rule from the rules database 126. The requests are sent from the event bridge 108 to the query application 110. The query application 110 further dissects the requests to identify at least one query per request that can be handled by resolvers within the query application 110. There is one resolver per query. The resolvers establish communication with at least one back-end server 120 to resolve the corresponding query. The resolvers then pull back information from the at least one back-end server 120 which resolves the corresponding query. The query application 110 organizes and sends the information which resolves the requests back to the event bridge 108. The event bridge 108 identifies the response from the query application 110 which satisfies the request from the user. The event bridge 108 then sends the response back to the communication message broker 106. The communication message broker 106 then returns the response to at least one front-end server 116 corresponding to the user who is initiating the communication and to any other user on the corresponding BAN.

In yet another embodiment, the user equipment 112 communicates with the front-end server 116 via the network 124 such that the front-end applications send messages relating to an action by a user. For example, the front-end server 116 communicates with the communication system 102 via the network 124 to send the messages. The communication system 102 receives the messages from the front-end server 116 where the messages are forwarded to the communication message broker 106, where the communication message broker 106 organizes information of the message. The communication message broker 106 then forwards the organized information to the event bridge 108 where the event bridge 108 breaks down the information further into requests where the event bridge 108 requires verification from a rules database 126 on how to proceed. From here, the event bridge 108 consults the rules database 126 to identify the appropriate rules to satisfy the requests. The rules in the rules database 126 may communicate with the event bridge 108 through a rule plugin, where the rules are customizable based on defined characteristics such as user preferences or account preferences and indicate conditional responses to the defined characteristics. For example, a rule may be to notify the account manager that someone added an item into the account, or if part of the rule may be to send back a message over the event bridge 108 and the user is disconnected from the network 124, then the rule may be to send a Short Message Service (SMS) notification to the user until the message is received. The rules database 126 identifies appropriate rules corresponding with the requests and sends the rules back to the event bridge 108. Here the rule directs the communication system 102 to send responses back to the user who is initiating the communication and an invitation to any other user on the corresponding BAN. As a result, the event bridge 108 processes the requests according to the rule from the rules database 126. The requests are sent from the event bridge 108 to the query application 110. The query application 110 further dissects the requests to identify at least one query per request that can be handled by resolvers within the query application 110. There is one resolver per query. The resolvers establish communication with at least one back-end server 120 to resolve the corresponding query. The resolvers then pull back information from the at least one back-end server 120 which resolves the corresponding query. The query application 110 organizes and sends the information which resolves the requests back to the event bridge 108. The event bridge 108 identifies the response from the query application 110 which satisfies the request from the user. The event bridge 108 then sends the response back to the communication message broker 106. The communication message broker 106 then returns the response to the user who is initiating the communication and an invitation to any other user on the corresponding BAN. The communication message broker 106 then receives a notification of completion with respect to the invitation from the other users of the BAN and sends a notification of completed action to the user. Finally, the communication message broker 106 receives a response from the user indicating completion of transaction.

In an embodiment, the user equipment 112 communicates with the front-end server 116 via the network 124 such that the front-end applications send messages relating to an action by a user. The front-end server 116 communicates with the communication system 102 via the network 124 to send the messages, where the messages comprise information about the user. The communication system 102 receives the messages from the front-end server 116. The messages are forwarded to the communication message broker 106. The communication message broker 106 has multiple interface ports for communication, which the communication message broker 106 uses to send the information about the user to a two-factor authentication system that is coupled to one of the interface ports. The communication message broker 106 then receives an authentication notification from the two-factor authentication system. The communication message broker 106 organizes information of the message. The communication message broker 106 then forwards the organized information to the event bridge 108 where the event bridge 108 breaks down the information further into requests where the event bridge 108 requires verification from a rules database 126 on how to proceed. From here, the event bridge 108 consults the rules database 126 to identify the appropriate rules to satisfy the requests. The rules in the rules database 126 may communicate with the event bridge 108 through a rule plugin, where the rules are customizable based on defined characteristics such as user preferences or account preferences and indicate conditional responses to the defined characteristics. For example, a rule may be to notify the account manager that someone added an item into the account, or if part of the rule may be to send back a message over the event bridge 108 and the user is disconnected from the network 124, then the rule may be to send a Short Message Service (SMS) notification to the user until the message is received. The rules database 126 identifies appropriate rules corresponding with the requests and sends the rules back to the event bridge 108. Here the rule directs the communication system 102 to send responses back to the user who is initiating the communication and to any other user on the corresponding BAN. As a result, the event bridge 108 processes the requests according to the rule from the rules database 126. The requests are sent from the event bridge 108 to the query application 110. The query application 110 further dissects the requests to identify at least one query per request that can be handled by resolvers within the query application 110. There is one resolver per query. The resolvers establish communication with at least one back-end server 120 to resolve the corresponding query. The resolvers then pull back information from the at least one back-end server 120 which resolves the corresponding query. The query application 110 organizes and sends the information which resolves the requests back to the event bridge 108. The event bridge 108 identifies the response from the query application 110 which satisfies the request from the user. The event bridge 108 then sends the response back to the communication message broker 106. The communication message broker 106 then returns the response to at least one front-end server 116 corresponding to the user who is initiating the communication and to any other user on the corresponding BAN.

Figure 2A:
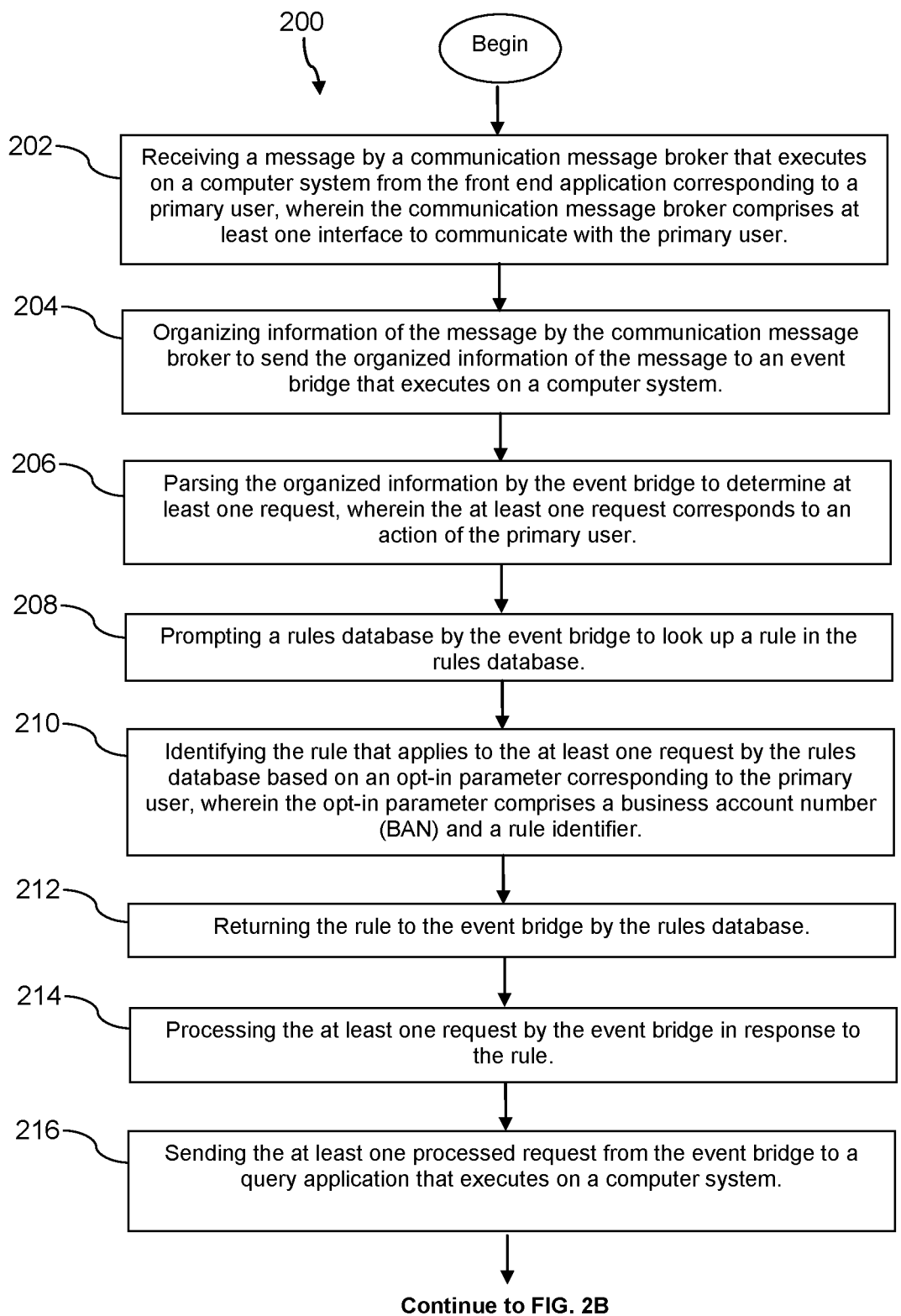
FIG. 2A is a flow chart of a method according to an embodiment of the disclosure.
Figure 2B:
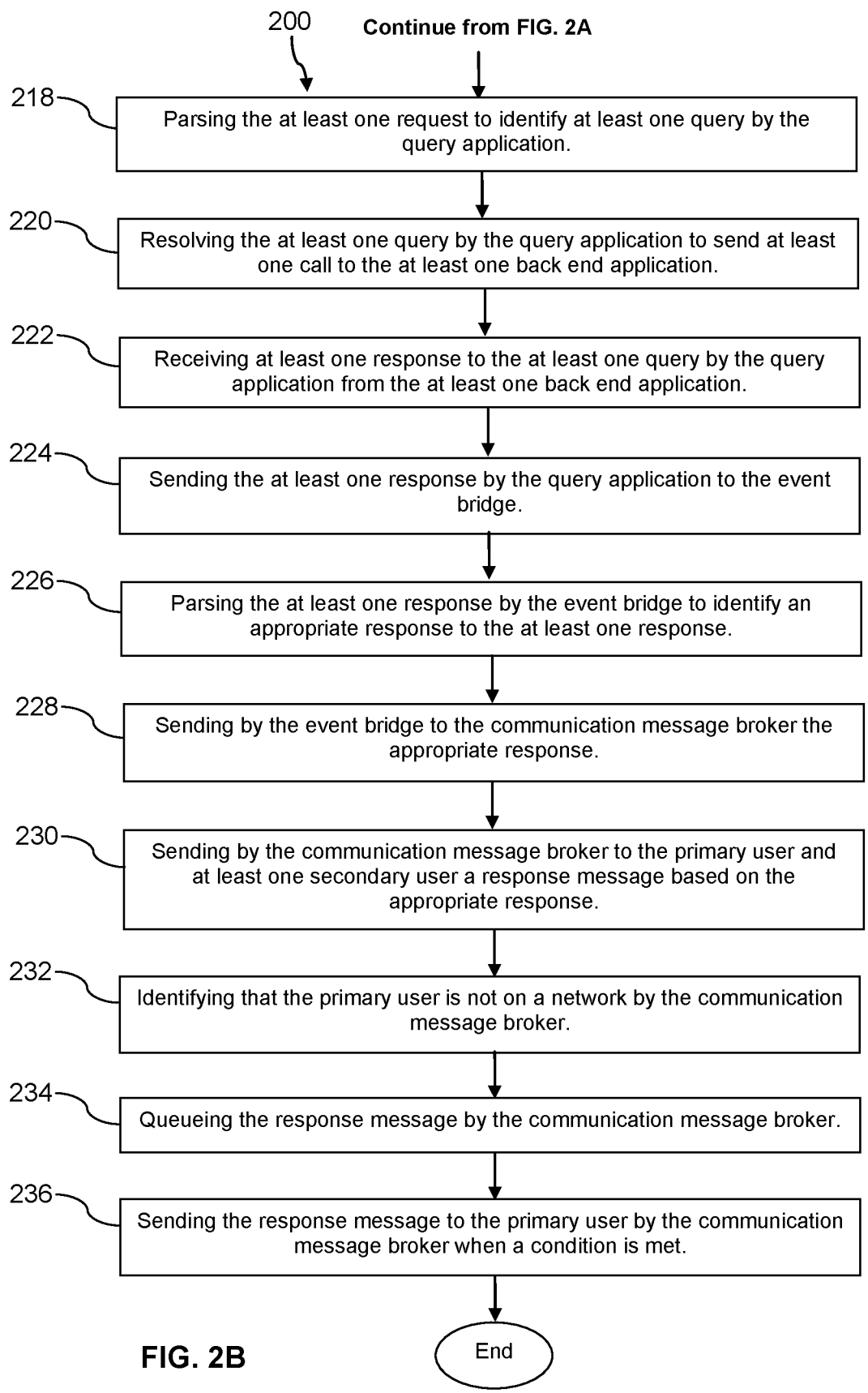
FIG. 2B is a continuation of the flow chart of a method according to an embodiment of the disclosure.

In FIG. 2A and FIG. 2B, a method 200 is described. In an embodiment, the method 200 is a method of multilayer communication between a front end application and at least one back end application. At block 202, the method 200 comprises receiving a message by a communication message broker that executes on a computer system from the front end application corresponding to a primary user, wherein the communication message broker comprises at least one interface to communicate with the primary user. At block 204, the method 200 comprises organizing information of the message by the communication message broker to send the organized information of the message to an event bridge that executes on a computer system.

At block 206, the method 200 comprises parsing the organized information by the event bridge to determine at least one request, wherein the at least one request corresponds to an action of the primary user. At block 208, the method 200 comprises prompting a rules database by the event bridge to look up a rule in the rules database.

At block 210, the method 200 comprises identifying the rule that applies to the at least one request by the rules database based on an opt-in parameter corresponding to the primary user, wherein the opt-in parameter comprises a BAN and a rule identifier. At block 212, the method 200 comprises returning the rule to the event bridge by the rules database. At block 214, the method 200 comprises processing the at least one request by the event bridge in response to the rule.

At block 216, the method 200 comprises sending the at least one processed request from the event bridge to a query application that executes on a computer system. At block 218, the method 200 comprises parsing the at least one request to identify at least one query by the query application. At block 220, the method 200 comprises resolving the at least one query by the query application to send at least one call to the at least one back end application. At block 222, the method 200 comprises receiving at least one response to the at least one query by the query application from the at least one back end application.

At block 224, the method 200 comprises sending the at least one response by the query application to the event bridge. At block 226, the method 200 comprises parsing the at least one response by the event bridge to identify an appropriate response to the at least one response. At block 228, the method 200 comprises sending by the event bridge to the communication message broker the appropriate response. At block 230, the method 200 further comprises sending by the communication message broker to the primary user and at least one secondary user a response message based on the appropriate response.

At block 232, the method 200 further comprises identifying that the primary user is not on a network by the communication message broker. At block 234, the method 200 further comprises queueing the response message by the communication message broker. At block 236, the method 200 further comprises sending the response message to the primary user by the communication message broker when a condition is met. In an embodiment, the condition may indicate for the communication message broker to queue the response until the next time the user connects to the network, or to queue and resend the response every 24 hours, or to queue and resend the response continuously until the user receives the message.

Figure 3A:
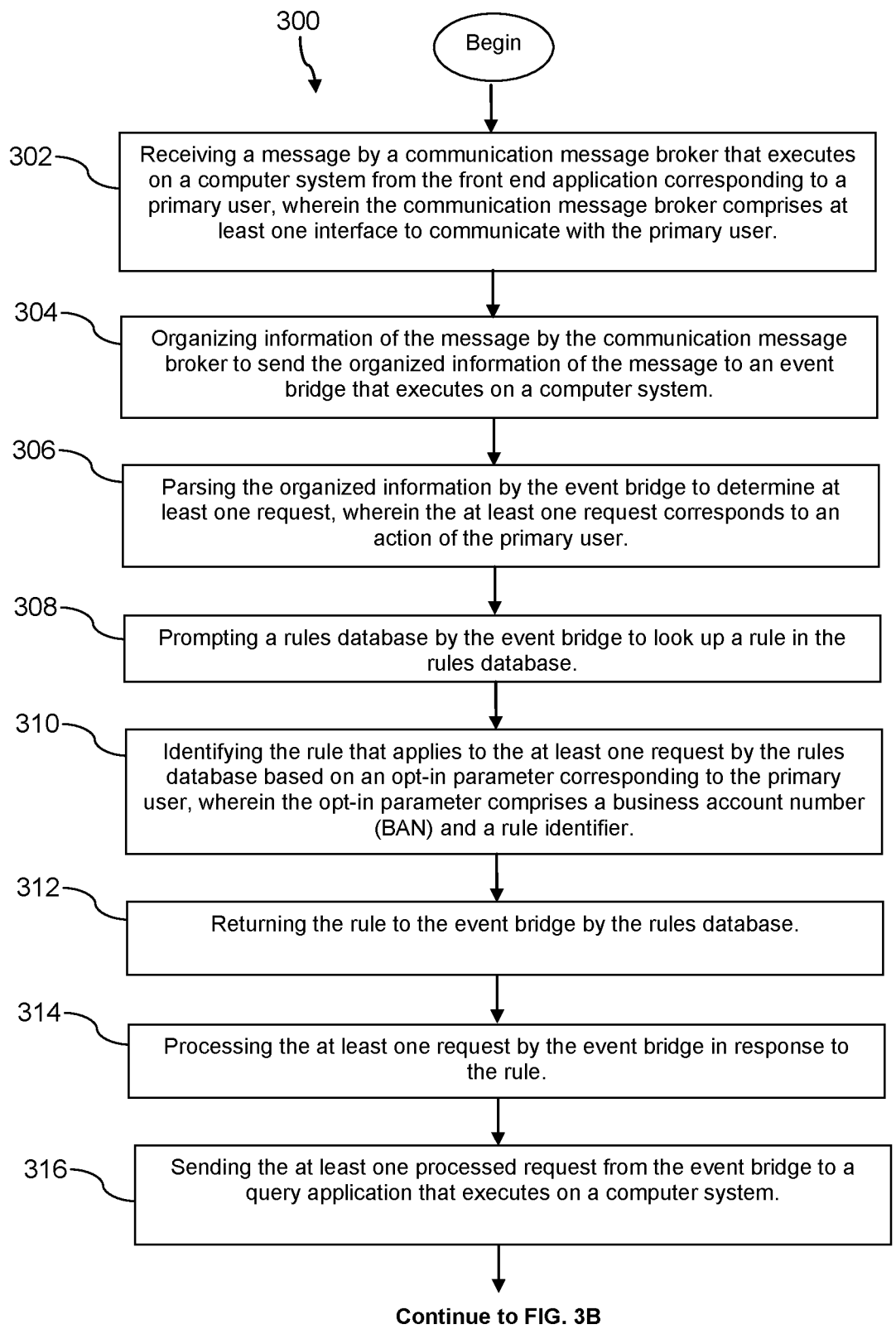
FIG. 3A is a flow chart of another method according to an embodiment of the disclosure.
Figure 3B:
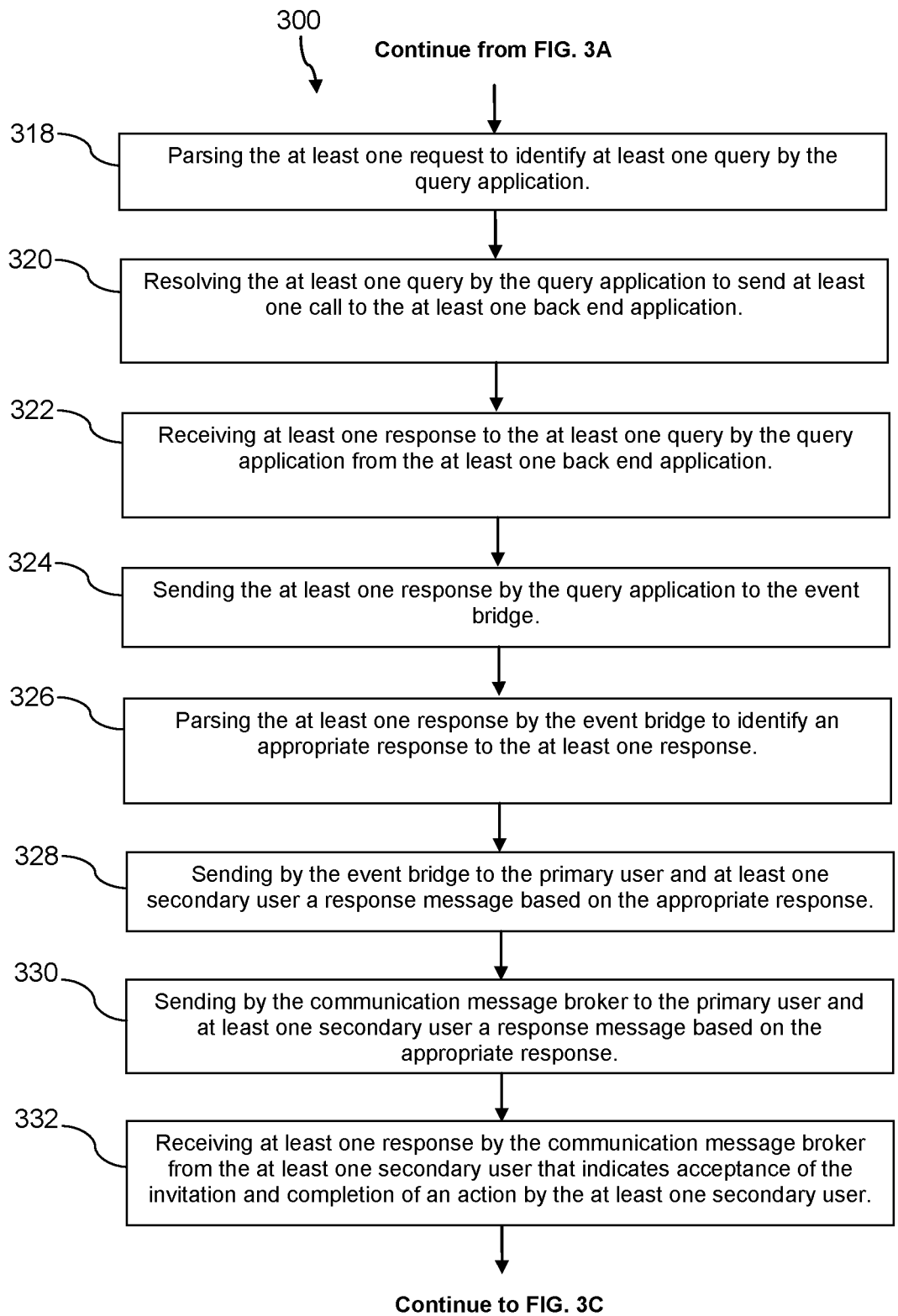
FIG. 3B is a continuation of the flow chart of another method according to an embodiment of the disclosure.
Figure 3C:
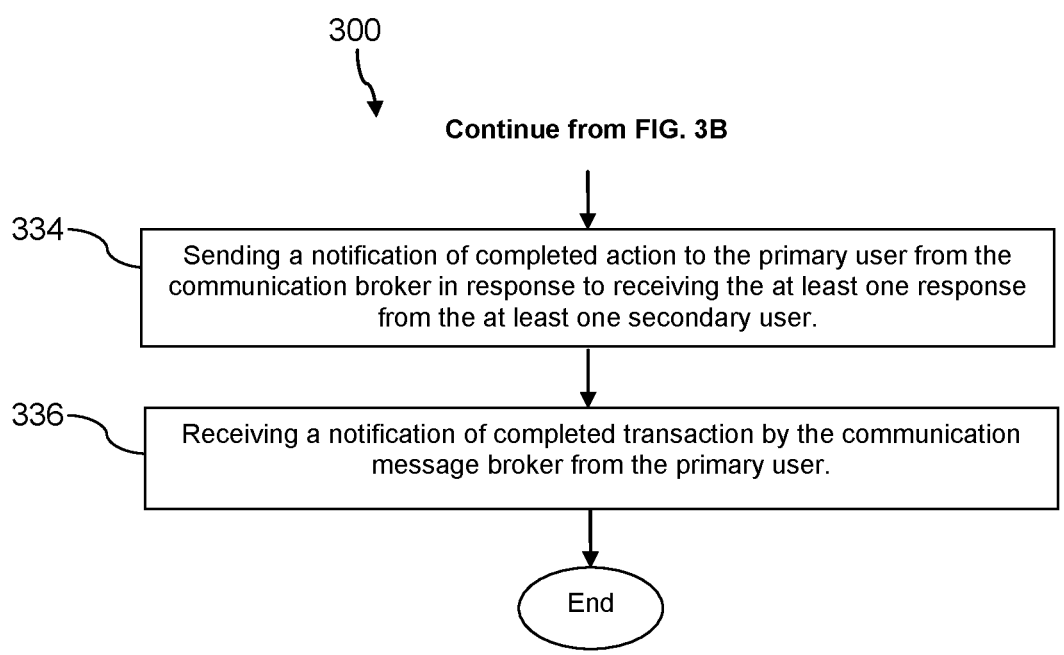
FIG. 3C is a continuation of the flow chart of another method according to an embodiment of the disclosure.

In FIG. 3A, FIG. 3B, and FIG. 3C, a method 300 is described. In an embodiment, the method 300 is a method of multilayer communication between a front end application and at least one back end application. At block 302, the method 300 comprises receiving a message by a communication message broker that executes on a computer system from the front end application corresponding to a primary user, wherein the communication message broker comprises at least one interface to communicate with the primary user. At block 304, the method 300 comprises organizing information of the message by the communication message broker to send the organized information of the message to an event bridge that executes on a computer system.

At block 306, the method 300 comprises parsing the organized information by the event bridge to determine at least one request, wherein the at least one request corresponds to an action of the primary user. At block 308, the method 300 comprises prompting a rules database by the event bridge to look up a rule in the rules database.

At block 310, the method 300 comprises identifying the rule that applies to the at least one request by the rules database based on an opt-in parameter corresponding to the primary user, wherein the opt-in parameter comprises a BAN and a rule identifier. At block 312, the method 300 comprises returning the rule to the event bridge by the rules database. At block 314, the method 300 comprises processing the at least one request by the event bridge in response to the rule.

At block 316, the method 300 comprises sending the at least one processed request from the event bridge to a query application that executes on a computer system. At block 318, the method 300 comprises parsing the at least one request to identify at least one query by the query application. At block 320, the method 300 comprises resolving the at least one query by the query application to send at least one call to the at least one back end application. At block 322, the method 300 comprises receiving at least one response to the at least one query by the query application from the at least one back end application.

At block 324, the method 300 comprises sending the at least one response by the query application to the event bridge. At block 326, the method 300 comprises parsing the at least one response by the event bridge to identify an appropriate response to the at least one response. At block 328, the method 300 comprises sending by the event bridge to the communication message broker the appropriate response. At block 330, the method 300 further comprises sending by the communication message broker to the primary user and at least one secondary user a response message based on the appropriate response.

At block 332, the method 300 further comprises receiving at least one response by the communication message broker from the at least one secondary user that indicates acceptance of the invitation and completion of an action by the at least one secondary user. At block 334, the method 300 further comprises sending a notification that the action is complete to the primary user from the communication message broker in response to receiving the at least one response from the at least one secondary user. Finally, at block 336, the method 300 further comprises receiving a notification of completed transaction by the communication message broker from the primary user. In an embodiment, if the primary user is not connected to a network and the response message is not delivered, then a rule from the rules database will cause the communication message broker to queue the response for a period of time depending on the rule. For example, the rule may indicate for the communication message broker to queue the response until the next time the user connects to the network, or to queue and resend the response every 24 hours, or to queue and resend the response continuously until the user receives the message.

Figure 4A:
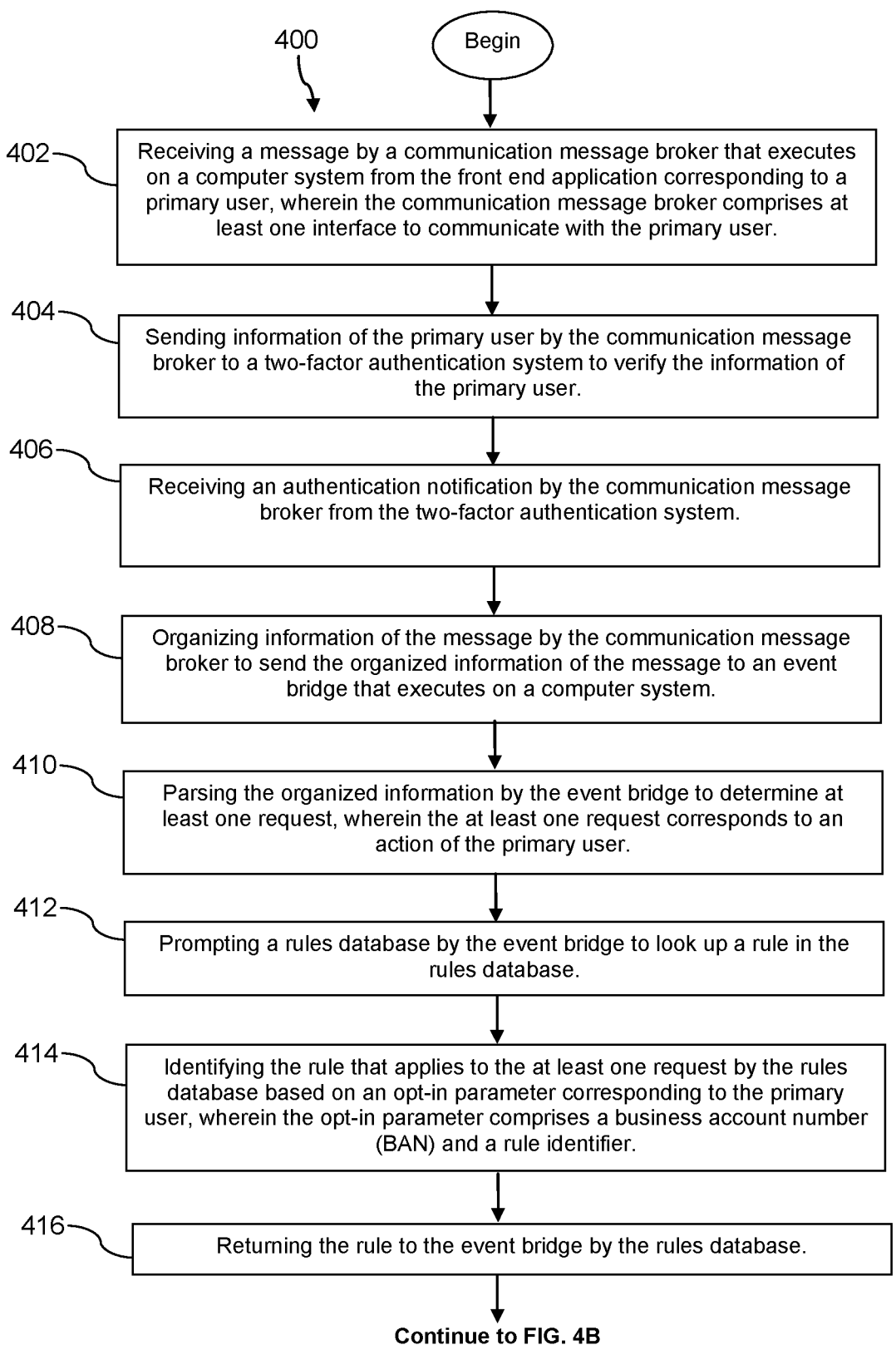
FIG. 4A is a flow chart of another method according to an embodiment of the disclosure.
Figure 4B:
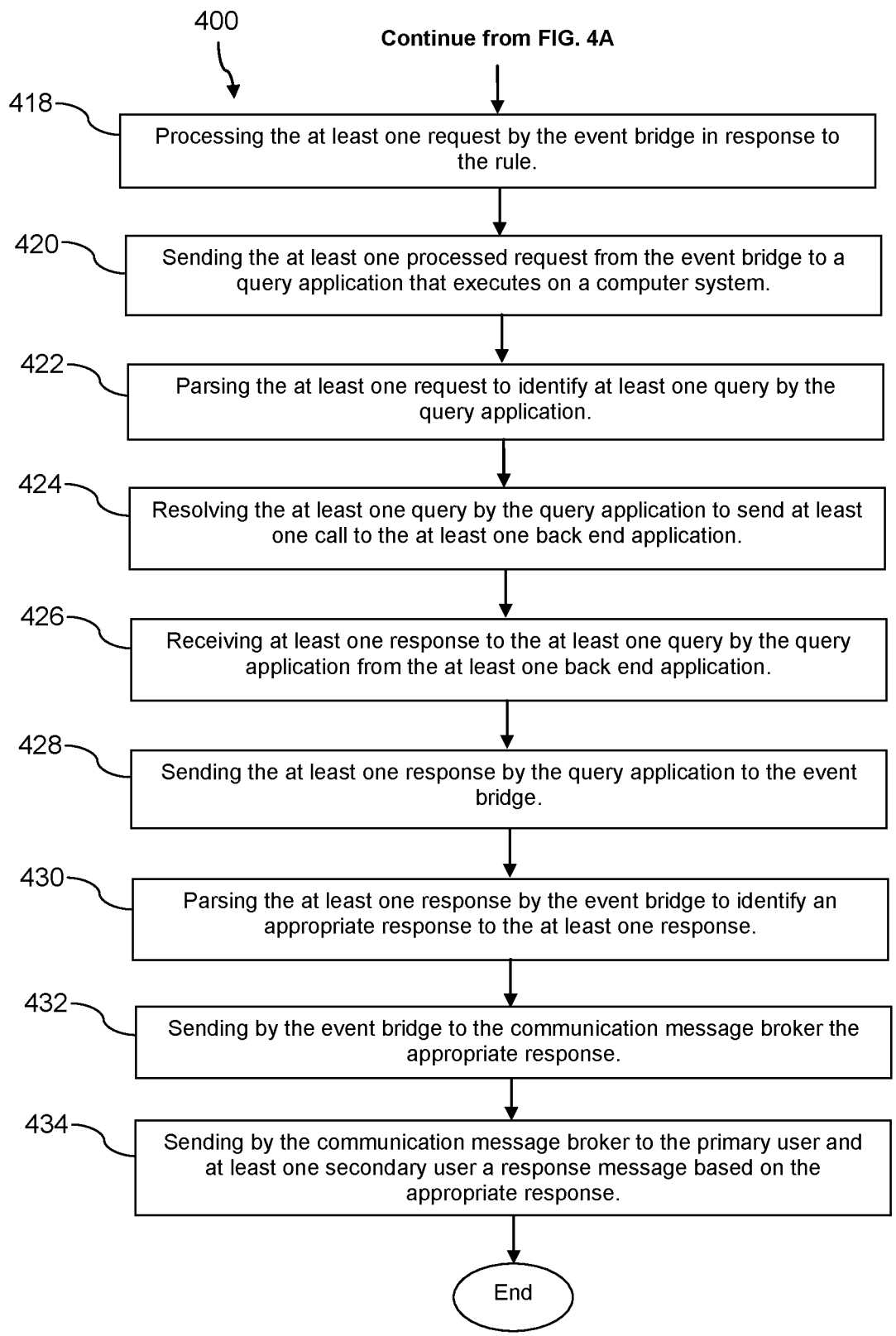
FIG. 4B is a continuation of the flow chart of another method according to an embodiment of the disclosure.

In FIG. 4A and FIG. 4B, a method 400 is described. In an embodiment, the method 400 is a method of multilayer communication between a front end application and at least one back end application. At block 402, the method 400 comprises receiving a message by a communication message broker that executes on a computer system from the front end application corresponding to a primary user, wherein the communication message broker comprises at least one interface to communicate with the primary user. At block 404, the method 400 comprises sending information of the primary user by the communication message broker to a two-factor authentication system to verify the information of the primary user. At block 406, the method 400 further comprises receiving an authentication notification by the communication message broker from the two-factor authentication system. At block 408, the method 400 comprises organizing information of the message by the communication message broker to send the organized information of the message to an event bridge that executes on a computer system.

At block 410, the method 400 comprises parsing the organized information by the event bridge to determine at least one request, wherein the at least one request corresponds to an action of the primary user. At block 412, the method 400 comprises prompting a rules database by the event bridge to look up a rule in the rules database.

At block 414, the method 400 comprises identifying the rule that applies to the at least one request by the rules database based on an opt-in parameter corresponding to the primary user, wherein the opt-in parameter comprises a BAN and a rule identifier. At block 416, the method 400 comprises returning the rule to the event bridge by the rules database. At block 418, the method 400 comprises processing the at least one request by the event bridge in response to the rule.

At block 420, the method 400 comprises sending the at least one processed request from the event bridge to a query application that executes on a computer system. At block 422, the method 400 comprises parsing the at least one request to identify at least one query by the query application. At block 424, the method 400 comprises resolving the at least one query by the query application to send at least one call to the at least one back end application. At block 426, the method 400 comprises receiving at least one response to the at least one query by the query application from the at least one back end application.

At block 428, the method 400 comprises sending the at least one response by the query application to the event bridge. At block 430, the method 400 comprises parsing the at least one response by the event bridge to identify an appropriate response to the at least one response. At block 432, the method 400 comprises sending by the event bridge to the communication message broker the appropriate response. At block 434, the method 400 further comprises sending by the communication message broker to the primary user and at least one secondary user a response message based on the appropriate response. In an embodiment, if the primary user is not connected to a network and the response message is not delivered, then a rule from the rules database will cause the communication message broker to queue the response for a period of time depending on the rule. For example, the rule may indicate for the communication message broker to queue the response until the next time the user connects to the network, or to queue and resend the response every 24 hours, or to queue and resend the response continuously until the user receives the message.

Figure 5:
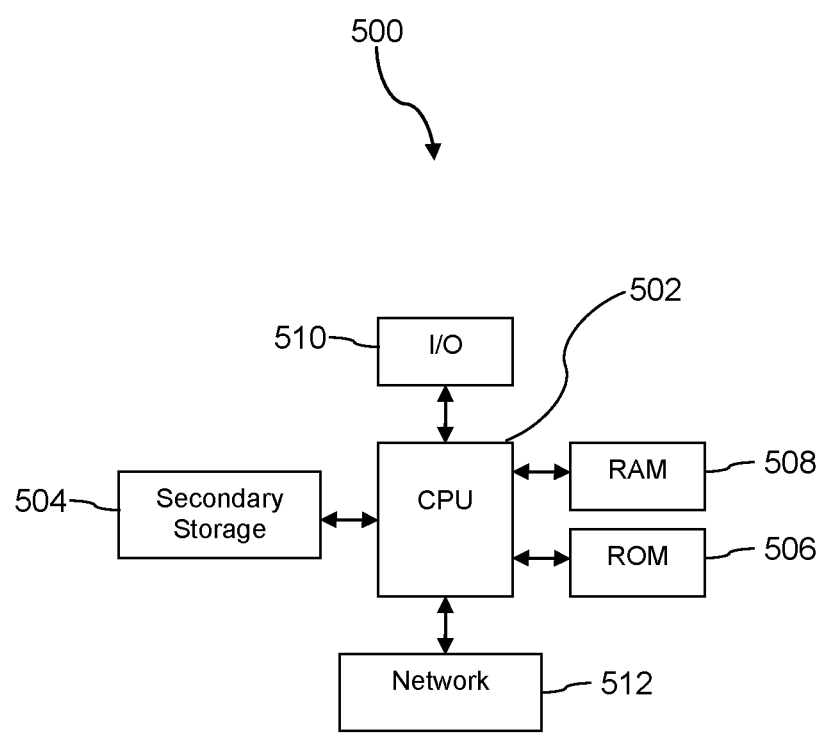
FIG. 5 is a block diagram of a computer system according to an embodiment of the disclosure.

FIG. 5 illustrates a computer system 500 suitable for implementing one or more embodiments disclosed herein. For example, in an embodiment, the server 104, the front-end server 116, and the back-end server 120 described above may be implemented in a form similar to that of computer system 500. The computer system 500 includes a processor 502 (which may be referred to as a central processor unit or CPU) that is in communication with memory devices including secondary storage 504, read only memory (ROM) 506, random access memory (RAM) 508, input/output (I/O) devices 510, and network connectivity devices 512. The processor 502 may be implemented as one or more CPU chips.

It is understood that by programming and/or loading executable instructions onto the computer system 500, at least one of the CPU 502, the RAM 508, and the ROM 506 are changed, transforming the computer system 500 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC) or in a field-programmable gate array (FPGA), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 500 is turned on or booted, the CPU 502 may execute a computer program or application. For example, the CPU 502 may execute software or firmware stored in the ROM 506 or stored in the RAM 508. In some cases, on boot and/or when the application is initiated, the CPU 502 may copy the application or portions of the application from the secondary storage 504 to the RAM 508 or to memory space within the CPU 502 itself, and the CPU 502 may then execute instructions that the application is comprised of. In some cases, the CPU 502 may copy the application or portions of the application from memory accessed via the network connectivity devices 512 or via the I/O devices 510 to the RAM 508 or to memory space within the CPU 502, and the CPU 502 may then execute instructions that the application is comprised of. During execution, an application may load instructions into the CPU 502, for example load some of the instructions of the application into a cache of the CPU 502. In some contexts, an application that is executed may be said to configure the CPU 502 to do something, e.g., to configure the CPU 502 to perform the function or functions promoted by the subject application. When the CPU 502 is configured in this way by the application, the CPU 502 becomes a specific purpose computer or a specific purpose machine.

The secondary storage 504 is typically comprised of one or more disk drives or tape drives and is used for non-volatile storage of data and as an over-flow data storage device if RAM 508 is not large enough to hold all working data. Secondary storage 504 may be used to store programs which are loaded into RAM 508 when such programs are selected for execution. The ROM 506 is used to store instructions and perhaps data which are read during program execution. ROM 506 is a non-volatile memory device which typically has a small memory capacity relative to the larger memory capacity of secondary storage 504. The RAM 508 is used to store volatile data and perhaps to store instructions. Access to both ROM 506 and RAM 508 is typically faster than to secondary storage 504. The secondary storage 504, the RAM 508, and/or the ROM 506 may be referred to in some contexts as computer readable storage media and/or non-transitory computer readable media.

I/O devices 510 may include printers, video monitors, liquid crystal displays (LCDs), touch screen displays, keyboards, keypads, switches, dials, mice, track balls, voice recognizers, card readers, paper tape readers, or other well-known input devices.

It is understood that by programming and/or loading executable instructions onto the computer system 500, at least one of the CPU 502, the RAM 508, and the ROM 506 are changed, transforming the computer system 500 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC or a FPGA, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 500 is turned on or booted, the CPU 502 may execute a computer program or application. For example, the CPU 502 may execute software or firmware stored in the ROM 506 or stored in the RAM 508. In some cases, on boot and/or when the application is initiated, the CPU 502 may copy the application or portions of the application from the secondary storage 504 to the RAM 508 or to memory space within the CPU 502 itself, and the CPU 502 may then execute instructions that the application is comprised of. In some cases, the CPU 502 may copy the application or portions of the application from memory accessed via the network connectivity devices 512 or via the I/O devices 510 to the RAM 508 or to memory space within the CPU 502, and the CPU 502 may then execute instructions that the application is comprised of. During execution, an application may load instructions into the CPU 502, for example load some of the instructions of the application into a cache of the CPU 502. In some contexts, an application that is executed may be said to configure the CPU 502 to do something, e.g., to configure the CPU 502 to perform the function or functions promoted by the subject application. When the CPU 502 is configured in this way by the application, the CPU 502 becomes a specific purpose computer or a specific purpose machine.

The secondary storage 504 is typically comprised of one or more disk drives or tape drives and is used for non-volatile storage of data and as an over-flow data storage device if RAM 508 is not large enough to hold all working data. Secondary storage 504 may be used to store programs which are loaded into RAM 508 when such programs are selected for execution. The ROM 506 is used to store instructions and perhaps data which are read during program execution. ROM 506 is a non-volatile memory device which typically has a small memory capacity relative to the larger memory capacity of secondary storage 504. The RAM 508 is used to store volatile data and perhaps to store instructions. Access to both ROM 506 and RAM 508 is typically faster than to secondary storage 504. The secondary storage 504, the RAM 508, and/or the ROM 506 may be referred to in some contexts as computer readable storage media and/or non-transitory computer readable media.

I/O devices 510 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 512 may take the form of modems, modem banks, Ethernet cards, Universal Serial Bus (USB) interface cards, serial interfaces, token ring cards, fiber distributed data interface (FDDI) cards, wireless local area network (WLAN) cards, radio transceiver cards, and/or other well-known network devices. The network connectivity devices 512 may provide wired communication links and/or wireless communication links (e.g., a first network connectivity device 512 may provide a wired communication link and a second network connectivity device 512 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), Global System for Mobile Communications (GSM), LTE, WI-FI (IEEE 802.11), BLUETOOTH, ZIGBEE, narrowband Internet of things (NB IoT), near field communications (NFC), and radio frequency identity (RFID). The radio transceiver cards may promote radio communications using fifth generation (5G), 5G New Radio, or 5G LTE radio communication protocols. These network connectivity devices 512 may enable the processor 502 to communicate with the Internet or one or more intranets. With such a network connection, it is contemplated that the processor 502 might receive information from the network, or might output information to the network in the course of performing the above-described method steps. Such information, which is often represented as a sequence of instructions to be executed using processor 502, may be received from and outputted to the network, for example, in the form of a computer data signal embodied in a carrier wave.

Such information, which may include data or instructions to be executed using processor 502 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 502 executes instructions, codes, computer programs, scripts which it accesses from hard disk, floppy disk, optical disk (these various disk based systems may all be considered secondary storage 504), flash drive, ROM 506, RAM 508, or the network connectivity devices 512. While only one processor 502 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 504, for example, hard drives, floppy disks, optical disks, and/or other device, the ROM 506, and/or the RAM 508 may be referred to in some contexts as non-transitory instructions and/or non-transitory information.

In an embodiment, the computer system 500 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 500 to provide the functionality of a number of servers that is not directly bound to the number of computers in the computer system 500. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 500, at least portions of the contents of the computer program product to the secondary storage 504, to the ROM 506, to the RAM 508, and/or to other non-volatile memory and volatile memory of the computer system 500. The processor 502 may process the executable instructions and/or data structures in part by directly accessing the computer program product, for example by reading from a CD-ROM disk inserted into a disk drive peripheral of the computer system 500. Alternatively, the processor 502 may process the executable instructions and/or data structures by remotely accessing the computer program product, for example by downloading the executable instructions and/or data structures from a remote server through the network connectivity devices 512. The computer program product may comprise instructions that promote the loading and/or copying of data, data structures, files, and/or executable instructions to the secondary storage 504, to the ROM 506, to the RAM 508, and/or to other non-volatile memory and volatile memory of the computer system 500.

In some contexts, the secondary storage 504, the ROM 506, and the RAM 508 may be referred to as a non-transitory computer readable medium or a computer readable storage media. A dynamic RAM embodiment of the RAM 508, likewise, may be referred to as a non-transitory computer readable medium in that while the dynamic RAM receives electrical power and is operated in accordance with its design, for example during a period of time during which the computer system 500 is turned on and operational, the dynamic RAM stores information that is written to it. Similarly, the processor 502 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of multilayer communication between a front-end application and at least one back-end application, comprising:

receiving a message by a communication message broker that executes on a computer system from the front-end application corresponding to a primary user, wherein the communication message broker comprises at least one interface to communicate with the primary user;

organizing information of the message by the communication message broker to send the organized information of the message to an event bridge that executes on a computer system;

parsing the organized information by the event bridge to determine at least one request, wherein the at least one request corresponds to an action of the primary user;

prompting a rules database by the event bridge to look up one or more rules in the rules database;

identifying the one or more rules that apply to the at least one request by the rules database based on an opt-in parameter corresponding to the primary user, wherein the opt-in parameter comprises a business account number (BAN) and a rule identifier;

returning the one or more rules to the event bridge by the rules database;

processing the at least one request by the event bridge in response to the one or more rules;

sending the at least one processed request from the event bridge to a query application that executes on a computer system;

parsing the at least one request to identify at least one query by the query application;

resolving the at least one query by the query application to send at least one call to the at least one back-end application;

receiving at least one response to the at least one query by the query application from the at least one back-end application;

sending the at least one response by the query application to the event bridge;

parsing the at least one response by the event bridge to identify an appropriate response to the at least one response;

sending by the event bridge to the communication message broker the appropriate response;

sending by the communication message broker a response message to a device associated with the primary user and one or more other devices associated with one or more secondary users based on the appropriate response and based on a rule of the one or more rules, wherein the rule indicates that common but tailored responses to the at least one query are to be returned to a plurality of device associated with the BAN including the one or more devices associated with the one or more secondary users;

identifying that the primary user is not on a network by the communication message broker;

queueing the response message by the communication message broker in response to identifying that the primary user is not on the network; and sending the response message to the primary user by the communication message broker when a condition is met.

2. The method of claim 1, wherein identifying the rule that applies to the at least one request, further comprises:

identifying whether the rule exists by the rules database; and returning a notification to send a response notification by the rules database to the event bridge when no rule exists.

3. The method of claim 1, wherein the opt-in parameter further comprises a client identifier, an opted in parameter, and an application identifier, wherein the opt-in parameter is based on the front-end application.

4. The method of claim 1, wherein the condition is when the communication message broker detects that the primary user returns to the network.

5. The method of claim 1, wherein the condition is when the communication message broker determines expiration of a time limit.

6. The method of claim 1, wherein the condition is to send the response message continuously.

7. A method of multilayer communication between a front-end application and at least one back-end application, comprising:

receiving a message by a communication message broker that executes on a computer system from the front-end application corresponding to a primary user, wherein the communication message broker comprises at least one interface to communicate with the primary user;

organizing information of the message by the communication message broker to send the organized information of the message to an event bridge that executes on a computer system;

parsing the organized information by the event bridge to determine at least one request, wherein the at least one request corresponds to an action of the primary user;

prompting a rules database by the event bridge to look up one or more rules in the rules database;

identifying the one or more rules that apply to the at least one request by the rules database based on an opt-in parameter corresponding to the primary user, wherein the opt-in parameter comprises a business account number (BAN) and a rule identifier;

returning the one or more rules to the event bridge by the rules database;

processing the at least one request by the event bridge in response to the one or more rules;

sending the at least one processed request from the event bridge to a query application that executes on a computer system;

parsing the at least one request to identify at least one query by the query application;

resolving the at least one query by the query application to send at least one call to the at least one back-end application;

receiving at least one response to the at least one call by the query application from the at least one back-end application;

sending the at least one response to the event bridge by the query application;

parsing the at least one response by the event bridge to identify an appropriate response, wherein the appropriate response responds to the message from the primary user;

sending by the event bridge to the communication message broker the appropriate response;

sending by the communication message broker a response message to a device associated with the primary user and one or more other devices associated with one or more secondary users based on the appropriate response and based on a rule of the one or more rules, wherein the rule indicates that common but tailored responses to the at least one query are to be returned to a plurality of device associated with the BAN including the one or more devices associated with the one or more secondary users, and wherein the response message is a notification of an invitation to the primary user and is the invitation to the one or more secondary users;

receiving at least one response by the communication message broker from the one or more secondary users that indicates acceptance of the invitation and completion of an action by the one or more secondary users;

sending a notification of completed action to the primary user from the communication message broker in response to receiving the at least one response from the one or more secondary users; and receiving a notification of completed transaction by the communication message broker from the primary user.

8. The method of claim 7, wherein identifying the rule that applies to the at least one request, further comprises:

identifying whether the rule exists by the rules database; and returning a notification to send a response notification by the rules database to the event bridge when no rule exists.

9. The method of claim 7, wherein the opt-in parameter further comprises a client identifier, an opted in parameter, and an application identifier, wherein the opt-in parameter is based on the front-end application.

10. The method of claim 7, wherein sending by the communication message broker the response message to the device associated with the primary user comprises:

identifying that the primary user is not on a network;

queueing the response message in response to identifying that the primary user is not on the network; and sending the response message to the device associated the primary user when the primary user is on the network.

11. The method of claim 7, wherein sending by the communication message broker the response message to the device associated with the primary user comprises:

identifying that the primary user is not on a network;

queueing the response message in response to identifying that the primary user is not on the network; and sending the response message to the device associated the primary user when the communication message broker reaches a preset time duration.

12. The method of claim 7, wherein sending by the communication message broker the response message to the device associated with the primary user comprises:

identifying that the primary user is not on a network;

queueing the response message in response to identifying that the primary user is not on the network; and sending the response message to the device associated the primary user continuously.

13. A method of multilayer communication between a front-end application and at least one back-end application, comprising:

receiving a message by a communication message broker that executes on a computer system from the front-end application corresponding to a primary user, wherein the communications broker comprises at least one interface to communicate with the primary user;

sending information of the primary user by the communication message broker to a two-factor authentication system to verify the information of the primary user;

receiving an authentication notification by the communication message broker from the two-factor authentication system;

organizing information of the message by the message broker to send the organized information to an event bridge that executes on a computer system when the authentication notification indicates verification of the primary user;

parsing the information by the event bridge to determine at least one request, wherein the at least one request corresponds to an action of the primary user;

prompting a rules database by the event bridge to look up one or more rules in the rules database;

identifying the one or more rules that apply to the at least one request by the rules database based on an opt-in parameter corresponding to the primary user, wherein the opt-in parameter comprises a business account number (BAN) and a rule identifier;

returning the one or more rules by the rules database to the event bridge;

processing the at least one request by the event bridge in response to the one or more rules;

sending the at least one processed request by the event bridge to a query application that executes on a computer system;

parsing the at least one request by the query application to identify at least one query;

resolving the at least one query by the query application to send at least one call to the at least one back-end application;

receiving at least one response to the at least one query by the query application from the at least one back-end application;

sending the at least one response by the query application to the event bridge;

parsing the at least one response by the event bridge to identify an appropriate response to the at least one response;

sending by the event bridge to the communication message broker the appropriate response; and sending by the communication message broker a response message to a device associated with the primary user and one or more other devices associated with one or more secondary users message based on the appropriate response and based on a rule of the one or more rules, wherein the rule indicates that common but tailored responses to the at least one query are to be returned to a plurality of device associated with the BAN including the one or more devices associated with the one or more secondary users.

14. The method of claim 13, wherein the two-factor authentication system is an interactive voice response (IVR) system.

15. The method of claim 13, further comprising rejecting access by the communication message broker to the primary user when the authentication notification does not indicate verification of the primary user.

16. The method of claim 13, wherein identifying the rule that applies to the at least one request, further comprises:
   identifying whether the rule exists by the rules database; and
   returning a notification to send a response notification by the rules database to the event bridge when no rule exists.

17. The method of claim 13, wherein the opt-in parameter further comprises a client identifier, an opted in parameter, and an application identifier, wherein the opt-in parameter is based on the front-end application.

18. The method of claim 13, wherein sending by the communication message broker the response message to the device associated with the primary user comprises:
   identifying that the primary user is not on a network;
   queueing the response message in response to identifying that the primary user is not on the network; and
   sending the response message to the primary user when the primary user is on the network.

19. The method of claim 13, wherein sending by the communication message broker the response message to the device associated with the primary user comprises:
   identifying that the primary user is not on a network;
   queueing the response message in response to identifying that the primary user is not on the network; and
   sending the response message to the primary user when the communication message broker reaches a preset time duration.

20. The method of claim 13, wherein sending by the communication message broker the response message to the device associated with the primary user comprises:
   identifying that the primary user is not on a network;
   queueing the response message in response to identifying that the primary user is not on the network; and
   sending the response message to the primary user continuously.

* * * * *